United States Patent Office 3,496,462
Patented Feb. 17, 1970

3,496,462
DIGITAL DISTORTION MEASUREMENT APPARATUS FOR ISOCHRONOUS CODED TELEGRAPH AND DATA SIGNALS
Maurice Auguste François Joseph Manière and Pierre Marotte, Conflans-Sainte-Honorine, France, assignors to Lignes Telegraphiques et Telephoniques, Paris, France
Filed Dec. 8, 1967, Ser. No. 689,028
Claims priority, application France, Dec. 27, 1966, 88,880
Int. Cl. G01r *11/00;* H04l *25/02;* G08b *29/00*
U.S. Cl. 324—68                              9 Claims

ABSTRACT OF THE DISCLOSURE

Apparatus for measuring the isochronous distortion of a bivalent modulation, the spacings between the significant instants of which fluctuate about a constant unit time interval, comprising means for deriving from said modulation periodic reference pulses at a frequency equal to the reciprocal of said unit time interval, means for deriving from said modulation significant pulses each corresponding to one of said significant instants, time measuring means including a first pulse generator delivering periodic measurement pulses at a much higher frequency than said frequency for digitally measuring the variable time interval between each of said significant pulses and the immediately preceding one of said reference pulses and for transferring the result of such measuring to a first pulse counter; a second, a third and a fourth pulse counter, a second generator delivering rapid periodic pulses at such a frequency that the duration of a train of said rapid pulses in number equal to the maximum counting capacity of said first counter be much shorter than said unit time interval; and logic circuit means controlled by each of said reference pulses and by output pulses delivered by said first, second and third counters on their returning to zero after reaching their maximum counting capacity, said logic circuit means causing one such pulse train to be applied to all of said first, second and third counters and the measurement pulse number already registered in said first counter to be transferred to either of said second and third counters according to whether latter said number is larger than that previously registered in said second counter or smaller than that previously registered in said third counter, no such transferring taking place when neither of the latter inequality conditions prevails; and said logic circuit means further causing the difference between the numbers registered in said second and third counters to be transferred to said fourth counter by applying thereto a fraction of latter said pulse train controlled by same said logic circuit means. Said apparatus also includes a manually or automatically operated switch for defining the duration of a measurement operation.

Field of the invention

This invention relates to a new device for measuring with a predetermined degree of accuracy the isochronous distortion of an isochronous bivalent modulation, more particularly of the type used for telegraph or data transmission purposes and, generally speaking, of a sequence of coded signals each having either of two possible signalling conditions and, in the absence of distortion, a duration equal to an integer multiple of a socalled "unit time interval."

The hereinafter used terminology will be that defined in the book "List of Definitions of Essential Telecommunications Terms" published by the International Telecommunications Union, Geneva, 1961, chapter "Telegraphy," pages 194–200.

It is known that, in a perfect isochronous bivalent modulation, transitions from one to the other of the two significant states of said modulation may only occur at significant instants, any two of which are spaced by said unit time interval or by an integer multiple thereof. This unit time interval is equal to the reciprocal of the so-called "modulation velocity" expressed in bauds. For instance, a unit time interval of 20 milliseconds corresponds to a modulation velocity of 50 bauds.

When such a perfect bivalent modulation is applied to the sending terminal of a communication link, the mutual spacings between the transitions of the modulation received at the receiving terminal of said link generally differ from those between the corresponding transitions at said sending terminal, some of the received transitions undergoing a longer delay and some a shorter one. The received modulation exhibits a distortion affecting its significant instants; this type of distortion is conventionally called "isochronous distortion."

More precisely, every significant instant exhibits a socalled "individual distortion degree," expressed as a percentage of the above-defined unit time interval and measured with respect to a corresponding ideal reference instant of a perfect modulation. By "isochronous distortion degree" must be understood the algebraic difference between the highest and lowest individual distortion degree affecting said significant instants during a sufficiently long and arbitrarily chosen time interval, taken as a basis for a distortion testing operation. Contrarily, to what is the case for the individual distortion degree, the so-defined isochronous distortion degree is independent of the choice of the ideal reference instants, provided they are spaced by the proper unit time interval.

Description of the prior art

Various devices for the measuring of the isochronous distortion degree, sometimes called "isochronous distortiometers," are known. Among them may be cited, by way of example, the apparatus described in the French Patent Ser. No. 1,388,766. In the latter, on the fluorescent screen of a cathode-ray oscilloscope, there appear on one hand luminous points regularly spaced along a closed line swept by the luminous spot of said oscilloscope, and on the other hand luminous flashes corresponding to the significant instants of the received modulation. The spacings between the points at which said flashes appear and a fixed point on said line, taken as an origin point, give a measure, on a certain scale, of the individual distortion degrees of the various significant instants. On the same scale, the spacing between the extreme positions of the flashes represents the isochronous distortion degree of the same received modulation. Apparatus of this type allows a trained operator to obtain an estimate of the distortion degree, rather than a precise measurement thereof.

In other known distortiometer types, distortion measurement is effected by comparing the times of occurrence of the transitions of the modulation received at the receiving end of communication link with those of a restituted modulation identical with that applied at the transmitting end of the same link but delayed by a predetermined amount. If the time shift of one of the former instants with respect to the corresponding one of the latter ceases to be comprised between a lower and an upper limit, a luminous signal appears. The limits may be adjusted by means of appropriate switches, which allows to obtain an approximate value of the isochronous distortion inflicted upon the signals by the transmission system. Such apparatuses, although convenient when it is only wished to ascertain that the distortion degree remains lower than some preassigned value, hardly allow the operator to obtain an accurate measurement of said degree.

Another method of isochronous distortion measurement has been proposed in the French Patent Ser. No. 1,176,374. In the latter, there is described an apparatus in which evaluation of time shifts is effected by comparing the polarities of two signals, one of which is the received distorted modulation and the other a corresponding perfect modulation, restituted from the former with a certain delay with respect thereto. However, this patent does not describe in a detailed manner the way in which the instants at which the relative polarity of the two signals changes are located. Moreover, the arrangement, although certainly allowing some estimation of the individual distortion of the successive significant instants, does not include any storing device for recording the values obtained from such estimation and should be completed by such a device, built according to known techniques in the best adapted form to the particularly considered measurement object.

The British Patents Nos. 637,722 and 913,981 describe telegraph signal distortion measuring devices in which the lagging or leading shifts of the significant instants of the received modulation from their ideal, nondistorted positions is measured with the aid of an auxiliary pulse generator delivering pulses at a frequency much higher than the modulation velocity of the received signals. The number of such pulses occurring between a suitably chosen reference pulse supplied by a synchronized time base and each significant instant is a measure of the leading or lagging of the latter instant with respect to its ideal position, that is of its positive or negative distortion. This number is couned by means of either of two pulse counting chains, according to its algebraic sign. Further elaboration of the results of such counting yields the desired measure of the overall distortion, taken over a given time interval equal to the whole duration of a distortion measurement operation. Finally, the measured value of this overall distortion, referred to such a time interval, may be displayed in visual form and even stored for some time before a new measurement operation is initiated.

SUMMARY OF THE INVENTION

The present invention aims at the performing of the distortion measurement functions by means of a simpler and more economical device than the previously known ones. This device includes but a few elements of a very reduced number of different types currently used in logic circuit technique.

An important feature of the invention is an arrangement by means of which all individual distortion measurements of the signals are reduced to "lag" measurements, this being made possible by a suitable choice of the of the reference instants. As it will be seen later on, this arrangement makes it possible to use a much simplified equipment and at the same time allows a precise and direct measurement of isochronous distortion.

In the explanations and description given hereinafter, it is essentially assumed that the distorted modulation which is to be submitted to measurement does not present a distortion degree higher than fifty percent, or at least that the actual distortion degree does not much exceed the latter value.

Before describing the invention proper, some general principles relating to isochronous distortion measurement will be briefly reminded.

To determine the isochronous distortion degree affecting a received modulation, it is necessary, in a first step, to determine the individual distortions of its successive significant instants. For this purpose, the time shifts of the latter instants from their ideal positions in a perfect modulation, identical with that from which the received modulation is derived, should be determined. In the most general case, such a perfect modulation is not available at the place where the distorted modulation is received.

However, it is sufficient, in practice, to compare the significant instants of the distorted modulation with certain transition instants defined from a periodic rectangular wave, the period of which is such that two successive of said transitions be spaced by a time interval equal to the average unit time interval of the distorted modulation. One of the so defined transition instants is usually taken as "the ideal reference instant."

The time position of this ideal reference instant is then defined from a time base delivering the above-said rectangular wave with a phase controlled by the modulation which is to be measured; this phase is so adjusted that the magnitudes of the highest negative (that is, leading) and positive (that is, lagging) distortion degrees to be expected, be substantially equal.

However, it is equally possible to adopt another convention, according to which—as it is the case in the invention—the ideal reference instant is so defined that all actual significant instants are delayed with respect thereto. In the latter case, the individual distortion degrees to be measured become all positive.

To achieve its object, the invention makes use of a combination of electrical elements capable of generating a periodic rectangular wave having a period equal to the average unit time interval of the modulation to be submitted to measurement (hereinafter designated as "the studied modulation"). From the transitions of the latter wave are derived corresponding short duration pulses, conventionally designated as "reference pulses," and obtained from those of said transitions which occur in one selected direction, for instance through time differentiation of said wave.

Any one of the significant instants of the studied modulation is thus referred to the particular instant at which the reference pulse which immediately precedes this significant instant appears; this particular instant will now be designated as the "reference instant" for the considered significant instant.

According to the invention, there is provided an isochronous distortion measuring device for a bivalent telegraph modulation, comprising means for defining the beginning and the end of a measurement operation duration, and means for measuring the delay of any significant instant of said modulation with respect to a corresponding reference instant, said means including a first pulse counter counting the number of periodically recurrent pulses, designated as "measurement pulses," occurring between said significant and said corresponding reference instant; as soon as such counting is effected, said counted number is compared with the largest and the smallest number of measurement pulses previously counted by said counter since the beginning of said operation; said largest and smallest numbers are immediately and respectively transferred, as soon as their counting is effective, into one or the other of a second and a third pulse counter, both identical with said first counter, and respectively playing the parts of a "maximum memory" and a "minimum memory." Said number counted by said first counter is automatically transferred to said second counter if it is larger than the number previously transferred thereto, and to said third counter if it is smaller than the number previously registered in said third counter. In the case where neither of these two possible conditions prevails, no change is produced in the numbers registered by said second and third counters.

Immediately after each significant instant, a fourth counter counts the difference of the numbers just registered in said second and third counters. The product of this difference by the ratio of the velocity of the studied modulation to the recurrence frequency of the measurement pulses is proportional to the value (expressed as a percentage of the average unit time interval of said modulation) of the isochronous distortion degree, defined over the duration extending from the beginning of the measurement operation to the considered significant instant.

Said fourth counter displays in digital form the value of the so measured distortion degree.

The duration of the measurement operation is given a predetermined value by known means, either manually or automatically operated. At the end of the latter duration, the displayed numerical value corresponds to the largest difference counted by said fourth counter; it constitutes a measure of the isochronous distortion of the studied modulation, for the observation period corresponding to the duration of said operation.

One advantage of the device of the invention is that it allows to obtain a real measurement rather than an estimate of the distortion degree, and that the accuracy of this measurement may be made as high as it is of practical interest and economically feasible.

Like other distortion measuring devices delivering the wanted information in digital form, the device of the invention offers the advantage that it is possible to associate therewith recording means, using for example perforated tape, to preserve the results of a measurement series effected at high speed on a continuous modulation of long duration, or else on several different modulations received at an operator's station through different channels.

For the same reason, another advantage of the device of the invention resides in the fact that it may be adapted to the statistical study of isochronous distortion, for instance to the determination of the probability of a modulation exceeding a preassigned distortion value during a time interval including a very large number of significant instants and corresponding transitions.

The device of the invention essentially comprises, in combination, the following means:

A time base, phase and frequency controlled by the studied modulation and delivering a periodic rectangular wave, the period of which is equal to the average unit time interval of said modulation, and the phase of which is so adjusted, relatively to said modulation, that all individual distortion degrees of its significant instants be positive ones, the smallest of these degrees having a value close to zero;

A triggered circuit for generating, from the transitions in a selected direction of said rectangular wave, short duration reference pulses periodically appearing at instants separated by a constant time interval equal to the average unit time interval of said modulation;

A further triggered circuit for deriving from the studied modulation, eventually after reshaping thereof, short duration control pulses, hereinafter called "significant pulses," respectively appearing at each significant instant of said modulation;

A first generator delivering periodic measurement pulses, the recurrence frequency of which is a high order integer multiple $kV$ of the modulation velocity $V$ of said modulation; the value of the integer number $k$ being selected according to the degree of accuracy which should be obtained;

A logic circuit, controlled by said measurement and reference pulses, the function of which is to transmit or to prevent the transmission of said measurement pulses to the counting input of a first pulse counter, which then counts those of the latter pulses which appear between a reference pulse and the next following significant pulse;

A second pulse generator delivering so-called "rapid" periodically recurring pulses, the recurrence frequency of which is much larger than that of the measurement pulses, and a logic circuit combination for transmitting, immediately after the appearance of a significant pulse, a train of said rapid pulses including a number of pulses equal to the maximum counting capacity of said first counter, and thereafter for transferring the number of pulses counted by said first counter into a second counter identical with the former and used as a "maximum memory," such transferring being subject to the condition that the number just counted by said first counter be larger than that already registered by said second counter. Alternatively, if the number counted by the first counter does not fill the latter condition, it is transferred to a third counter, used as a "minimum memory" and identical with said first and second counters, subject to the condition that the number just counted by said first counter be smaller than that already registered by said third counter. In the case where none of the two just-mentioned conditions prevails, no transferring takes place from said first counter to either of said second and third counters;

A further logic circuit and a fourth pulse counter measuring, by counting of a pulse series issued from said second generator, the difference between the numbers respectively registered in said second and third counters, immediately after the passing of a significant instant and the appearance of a corresponding significant pulse;

And auxiliary means for giving a predetermined value (or one of a plurality of such values) to the duration of a measurement operation.

Other advantages and features of the invention will be apparent from the description of a preferred embodiment thereof, made with the aid of the annexed drawings, and hereinafter given by way of example and without limiting thereby the scope of the invention.

DESCRIPTION OF PREFERRED EMBODIMENT

Figure 1:
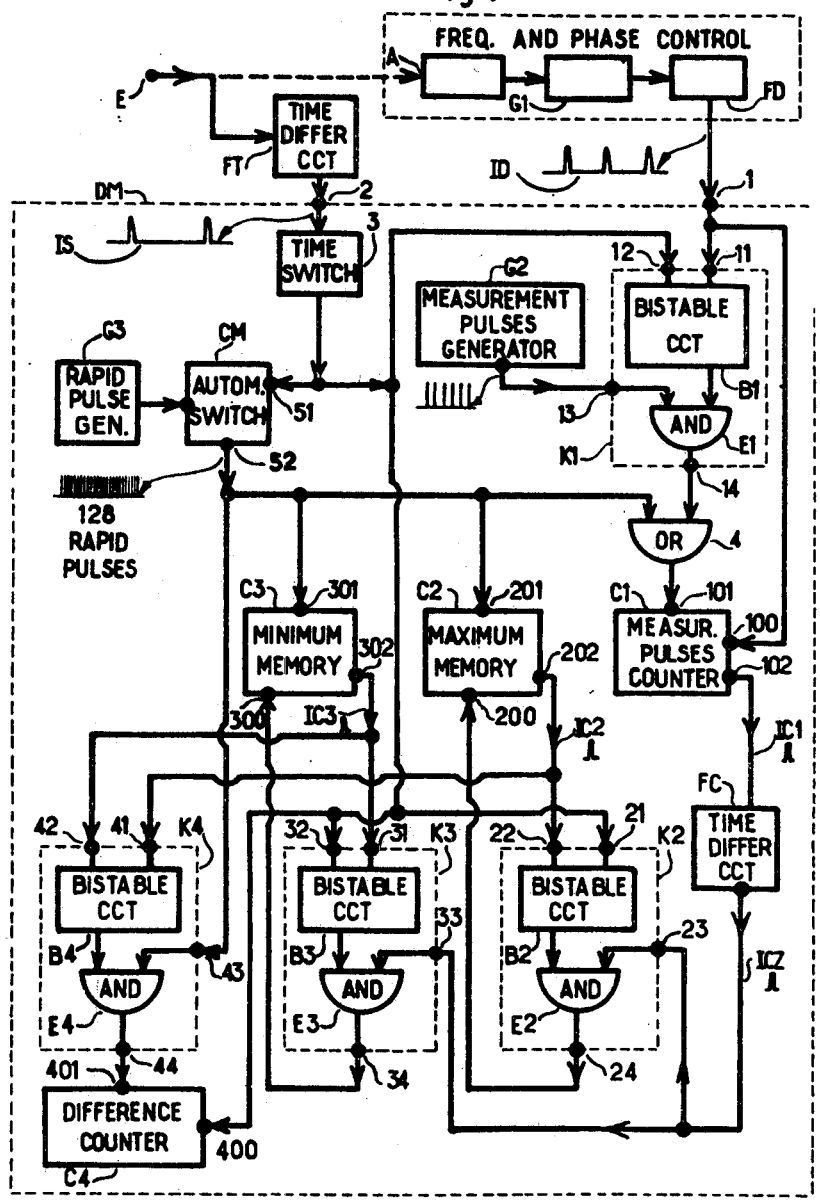
FIG. 1 is a functional diagram of a device according to the invention for the measurement of the isochronous distortion degree of an isochronous bivalent modulation.

Referring first to FIG. 1, in the latter figure:

FT is an input circuit generating, from the transitions of the modulation received at terminal E, short duration pulses, hereinafter called "significant pulses" and designated as "IS," occuring at the significant instants of said modulation;

G1 is a signal source, operating as a time base and controlled for its frequency and phase by the modulation received at E through the synchronizing unit A. The source G1 delivers a periodic rectangular wave, the period $Tm$ of which is equal to the average unit time interval of the received modulation and the phase of which with respect to the latter is adjusted according to the above-mentioned rule. Such a time base, of a known type, is described, by way of example, in the book by W. P. Bennett and J. R. Davey, entitled, "Data Transmission," and published by McGraw Hill Book Co., New York, 1965, in the chapter of this book "Methods of Synchronization," pages 260 to 262.

FD is a circuit which generates, from said rectangular wave, the short duration pulses hereinabove designated as "the reference pulses" and shown in FIG. 1 as ID, which pulses appear at recurring instants denoted in the following by $tD$;

DM is the distortiometer proper, including two input terminals 1 and 2 to which are respectively applied the above-said pulses ID and IS, and comprising the following elements:

A first generator G2 delivering measurement pulses, the recurence frequency of which F1 is an integer multiple $kV$ of the modulation velocity $V$ (in the described example, the selected value for $k$ is 200, in order to obtain an acurracy of one-half percent);

A first binary counter C1 having a number $n$ of stages, here assumed to be equal to 7 and having a zero reset input 100 to which a zero-resetting pulse may be applied, a counting input 101 to which the measurement pulses are applied, and an output 102 from which an output pulse IC1 is transmitted when the counter C1 suddenly passes from its full capacity, equal to 127, to its zero position;

A second seven-stage binary counter C2, of the same type as counter C1, used as the "maximum memory," the counting and zero resetting inputs and the output of which are respectively designated by the reference numbers 200, 201 and 202; said counter C2 emitting an output pulse IC2 on its returning to zero after reaching its maximum counting capacity of 127;

A third seven-stage binary counter C3, of the same type as counters C1 and C2, but used as the "minimum memory," the counting and zero-resetting inputs of which are respectively designated by the reference numbers 300, 301 and 302; said counter C3 emitting an output pulse IC3 on its returning to zero after reaching its maximum counting capacity of 127;

A circuit FC, for instance a time differentiator, which derives from the output pulse IC1 from counter C1 a control pulse ICZ, used for the zero-resetting of counters C2 and C3 when the counting registered in counter C1 must be transferred to either of counters C2 and C3:

A second generator G3 delivering rapidly recurring pulses at a recurrence frequency F2 high enough to make the duration of a train of 128 of said pulses short in comparison with that of the unit time interval of the studied modulation;

Automatic switching means CM having a control input 51 and an output 52, associated with generator G3 and receiving therefrom, to transmit them to latter said output, pulses delivered by this generator, this being effected, according to known techniques, in the form of trains including a predetermined number of successive "rapid" pulses (this number being equal to 128 in the presently described example). The transmission of such a pulse train to the output 52 is triggered by the application to 51 of each one of the significant pulses IS appearing at the significant instants of the studied modulation, such transmission being automatically interrupted after the passing of the 128th pulse. Any one of these 128-pulse trains is simultaneously applied to the counting inputs of counters C1, C2 and C3, directly for C1 and C2 and through gate means 4 for C1, the application commencing at any instant when a significant pulse appears at terminal 2;

A first electronic switching means K1, comprising first and second control inputs 11 and 12, a signal input 13 and an output 14. This electronic switching means is constituted by a bistable circuit B1 combined with a logic "AND" circuit E1, said bistable circuit B1 passing from its "zero" state to its "one" state when one of said reference pulses ID is applied to its input 12, and said "AND" circuit E1 transmitting or not transmitting the measurement pulses from G2, applied to the input 13 of K1, to the output 14 of the latter, according to the momentaneous state of circuit B1. Circuit K1 thus constitutes an electronic switching means which establishes a connection between 13 and 14 when a reference pulse ID is applied to its control input 11 and which breaks off this connection when the significant pulse IS is applied to its other control input 12;

A logic "OR" circuit, constituting the above-mentioned gate means 4, letting through toward the counting input of counter C1 the measurement pulse trains from G1 transmitted through K1, or, alternatively, the 128 rapid pulse trains from G3 transmitted through CM;

A second electronic switching means K2 of similar constitution to that of K1, having control inputs 21 and 22, a signal input 23 and a signal output 24, and constituted by a bistable circuit B2 associated with an "AND" circuit E2, siad switching means K2 establishing connection 23–24 when one of the above-said pulses IS is applied to its control input 21 and breaking off the latter connection when one of the above-said pulses IC2 from the output of C2 is applied to its other control input 22;

A third electronic switching means K2, of similar constitution to that of K1, having control inputs 31 and 32, a signal input 33 and a signal output 34, and constituted by a bistable circuit B3 associated with an "AND" circuit E3, said switching means K3 establishing the connection 33–34 when one of the above-said pulses IC3 from the output of counter C3 is applied to its control input 31 and breaking off the latter connection when one of the above-said pulses IS is applied to its other control input 32;

A fourth electronic switching means K4, of similar constitution to that of K1, having control inputs 41 and 42, a signal input 43 and a signal output 44, and constituted by a bistable circuit B4 associated with an "AND" circuit E4, said switching means K4 establishing the connection 43–44 when one of the above-said pulses IC2 is applied to its control input 41 and breaking off the latter connection when one of the above-said pulses IC3 from the output of counter C3 is applied to its other control input 42;

A decimal pulse counter C4, having a zero-resetting input 400 and a counting input 401, to the latter of which are applied the rapid pulses transmitted through the switching means K4, said decimal counter displaying in digital form the values of the various isochronous distortion degrees presented by the studied modulation during a measurement operation.

In FIG. 1 may still be seen at 3 a switch, the function of which is to put the device of FIG. 1 in service at will. This switch may be an ordinary, manually operated switch or, preferably, an automatic switch making contact by manual actuation and thereafter automatically breaking contact after a predetermined time interval. This switch will be designated, for short, as "the time switch."

Figure 2:
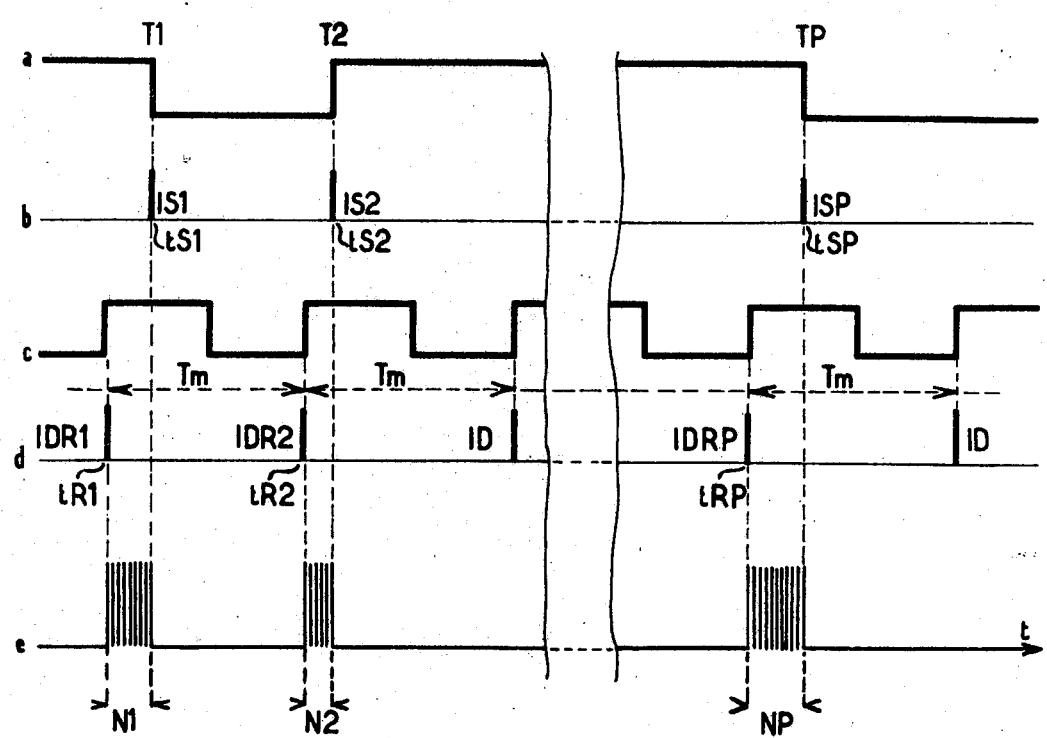
FIG. 2 shows graphic representations of signals at various points of the device of FIG. 1, which are useful for the understanding of the performance of the device of FIG. 1.

Referring now to FIG. 2, line (a) shows the wave shape of the studied modulation, comprising transitions T1, T2 . . . TP; line (b) shows the corresponding significant pulses, denoted by IS1, IS2 . . . ISP and respectively derived from transitions T1, T2 . . . TP occurring at the significant instants $t$S1, $t$S2 . . . $t$SP of said modulation; line (c) shows the rectangular wave of period T$m$ equal to the unit time interval of the modulation and supplied by the time base G1; and line (d) shows the reference pulses ID, also of period T$m$, derived from the positive transitions of said rectangular wave. Those of the latter pulses which are designated, in FIG. 2, by IDR1, IDR2 . . . IDRP play the part of time marking pulses for the respective instants $t$R1, $t$R2 . . . $t$RP, each of which is a reference instant for a corresponding one of the significant instants $t$S1, $t$S2 . . . $t$SP; finally, line (e) shows the measurement pulse trains respectively applied to the counting input of counter C1, between instants $t$R1 and $t$S1, or $t$R2 and $t$S2 . . . $t$RP and $t$SP, latter said pulse trains containing N1, N2 . . . NP pulses, respectively.

The operation of the device of FIG. 1 will now be described.

Each one of pulses ID is simultaneously applied to the counting input 10 of counter C1 and to the control input 11 of switching means K1.

Each one of pulses IS is simultaneously applied to the control input 12 of switching means K1, to the control input 21 of switching means K2, to the control input 32 of switching means K3, to the control input K1 of the automatic switching means CM, and to the zero resetting input of counter C4.

Each one of pulses ICZ is simultaneously applied to the signal input 23 of switching means K2 and to the control input 41 of switching means K4.

Each one of pulses IC2 is simultaneously applied to the control input 31 of switching means K3 and to the control input 41 of switching means K4.

Each one of pulses IC3 is simultaneously applied to the control input 31 of switching means K3 and to the control input 42 of switching means K4.

At the beginning of the measurement operation, counter C1 is brought back to the zero position, while counters C2 and C3 are brought to their zero and 127 positions, respectively.

When a pulse such as IDR1 is received, at the reference instant $tR1$, at the input terminal 1 of the part DM of the arrangement of FIG. 1, this pulse simultaneously causes the zero resetting of counter C1 and the establishing of a connection 13–14 inside switching means K1, the latter switching means then transmitting, through circuit 4, the measurement pulses supplied by G2 to the counting input 101 of counter C1, which then begins the counting of the latter pulses.

When a significant pulse such as IS1 is received, at a significant instant, at the other input terminal 2 of DM, it simultaneously causes:

(a) The breaking off of connection 13–14 inside K1 (which connection had been previously established by pulse IDR1), the transmission of measurement pulses from G2 to counter C1 then being interrupted;

(b) The triggering of a train of 128 rapid pulses which is simultaneously applied, from the output 52 of CM, to the respective counting inputs 101, 201 and 301 of counters C1, C2 and C3, and to the signal input 43 of switching means K4;

(c) The establishing of connection 23–24 inside K2 and the interrupting of connection 33–34 inside K3;

(d) The zero resetting of the decimal counter K4.

Between the reference instant $tR1$ and the significant instant $tS1$, counter C1 has counted a pulse number N1, which is a measure of the degree of individual distortion of the significant instant $tS1$.

This number N1 is, at the same time, larger than the contents of the maximum memory (counter C2), which still is zero, and smaller than the contents of the minimum memory (counter C2), which then is 127; the number N1 will be transferred to the latter memories by means of a process which will now be explained.

When the train of 128 rapid pulses issuing from CM is simultaneously applied, at instant $tS1$, to the counting inputs of all of the three counters C1, C2, C3, the latter begin to count these pulses. The first of them causes the return to zero of counter C3, which was in its maximum counting position of 127; the output pulse IC3 then transmitted by counter C3 is applied to the control input 31 of switching means K3 and causes connection 33–34, previously cut off by the pulse IS1, to be reestablished.

Counter C1 returns to zero when a number of rapid pulses equal to (128–N1) have been transmitted from CM through 4. At this time, it emits a pulse IC1 from which a control pulse ICZ is derived through circuit FC. The latter pulse, simultaneously transmitted through switching means K2 to the zero resetting input 200 of counter K2 and through switching means K3 to the zero resetting input 300 of counter C3, causes the simultaneous return to zero of counters C2 and C3, which then begin to count, from said time and simultaneously with counter C1 (which counts for a second time) the remaining 128–(128–N1), that is the N1 pulses still to pass in the 128-pulse train.

At the end of the transmitting of the 128 rapid pulses, number N1 is registered in counter C1 and is also transferred to counters C2 and C3, which take it in store.

The measurement of the individual distortion degree of the significant instant $tS2$ is effected, in the same manner as that of the individual distortion degree of the significant instant $tS1$, by counting in counter C1 of the measurement pulses transmitted through switching means K1 between the reference instant $tR2$ and the significant instant $tS2$.

Designating by N2 the number of pulses counted by counter C1 when pulse IS2 appears, two cases must be considered, according to which of the numbers N1 and N2 is the larger.

In the case where N2 is larger than N1, transferring of said number N2 to counter C2 is effected in the following manner. After the instant $tS2$ when the train of 128 rapid pulses is simultaneously applied to the three counters C1, C2 and C3, counter C1 returns to zero as soon as (128–N2) of said rapid pulses have been received from CM. The control pulse ICZ is then transmitted through switching means K2 to the zero resetting input 200 of counter C2, thereby causing the return to zero of the latter counter; but said pulse ICZ is unable to pass through switching means K3. Counter C2 then begins to count, from the instant when counter C1 has returned to zero and simultaneously with said counter C1, the 128–(128–N2), that is N2 remaining rapid pulses. This number N2, larger than N1, is thus transferred to the maximum memory (counter C2) instead of the previously registered number N1. The minimum memory (counter C3), which has been unable to return to zero, since pulse ICZ has been unable to pass through K3, returns to its initial position N1 after having counted the 128 rapid pulses received from the output of CM, and thus keeps in store the number N1 smaller than N2.

In the case where N2 is smaller than N1, transferring of N2 into counter C3 is effected through the following process.

On the simultaneous applying of the 128 rapid pulses to counters C1, C2 and C3, the latter two simultaneously pass, in the first place, from 127 to zero as soon as (128–N1) of said rapid pulses have been transmitted. The output pulse IC2 from counter C2 interrupts connection 23–24 inside switching means K2, and the output pulse IC3 from C3 reestablishes connection 33–34 inside switching means K3; counter C1 returns to zero when (128–N2) rapid pulses have been received from CM. The control pulse ICZ is unable to pass through switching means K2, but tht same pulse ICZ is transmitted through switching means K3 to the zero resetting input 300 of counter C3, causing the return to zero of the latter, which subsequently counts, simultaneously with counter C1, the 128–(128–N2), that is N2 remaining rapid pulses. Number N2, smaller than N1, is then transferred to the minimum memory (counter C3), instead of number N1 previously registered therein. The maximum memory C2, having not been through back to zero by pulse ICZ (which has been unable to pass through K2), returns to its initial position N1 after counting the 128 rapid pulses, thus keeping in store number N1 larger than N2.

The measurement of the individual distortion degree of any significant instant $tSP$ is effected as previously explained, by counting in counter C1 the measurement pulses transmitted through switching means K1 between the reference instant $tRP$ and said significant instant $tSP$.

Designating by NP the number of the latter pulses, and by M and $m$ the respective numbers of pulses previously registered in counters C2 and C3, said numbers M and $m$ respectively represent the highest and lowest previously measured individual distortion degrees; NP may be larger than M, smaller than $m$, or comprised between M and $m$.

In the case where M is larger than M, number NP is transferred to C2 and takes the place of number M, according to the above-explained process for the transferring of number N2 to counter C2 in the case where N2 was larger than N1, the contents $m$ of counter C3 remaining unaltered.

In the case where NP is smaller than $m$, number NP is transferred to counter C3 and takes the place of number $m$, according to the above-explained process for the transferring of number N2 to the latter counter in the case where N2 was smaller as N1, the contents M of C2 remaining unaltered.

In the case where NP is comprised between M and $m$, said number NP, smaller than M, cannot be transferred to counter C2 and, being also smaller than $m$, cannot be transferred to counter C3. Counters C2 and C3 thus keep in store numbers M and $m$, respectively.

For each transition of the studied modulation, the difference between the contents M of counter C2 and the contents $m$ of counter C3 is obtained by the counting, in the decimal counter C4, of the rapid pulses applied to the counting input of the latter between the instants at which counters C2 and C3, respectively, return to zero. The process through which this operation takes place is the following.

When the train of 128 rapid pulses supplied by CM is simultaneously applied to the counting inputs of counters C1, C2 and C3, counter C2 returns to zero as soon as (128–M) of said rapid pulses have ben delivered by CM. Pulse IC2, then emitted by counter C2, is applied to the control input 41 of switching means K4, which results in the establishing of connection 43–44 inside the latter and allows the rapid pulses applied to the signal input 43 of K4 to reach the counting input of counter C4. Counter C4 then begins to count the 128–(128–M), that is M remaining rapid pulses; counter C3 thereafter returns from 127 to zero as soon as (128–m) rapid pulse have been delivered by CM. Pulse IC3 then emitted by C3 and applied to the control input 42 of switching means K4, causes the interruption of connection 43–44 inside the latter, thus blocking transmission to counter C4 of the last 128–(128–m), that is m pulses delivered by CM. Between instants at which counters C2 and C3 have returned from 127 to zero, a number of rapid pulses equal to (M–m) have been transmitted to C4 and registered therein.

The difference (M–m) found after each transition of the studied modulation is a measure of the isochronous distortion degree displayed by this modulation from the beginning of the measurement operation to the instant at which this transition occurs. As a percentage of the average unit time interval, the value of the distortion degree may be expressed by the formula:

$$D = 100(M-m)V/F1 = 100(M-m)/k$$

the symbols V, F1 and $k$ designating, as previously, the values of the modulation velocity, the frequency of the measurement pulses and the ratio of the latter to the former.

In practice, suitable means for visually displaying the successive numerical values of D are associated with counter C4. At the end of a measurement operation, the last value obtained during said operation remains displayed.

The value given by the above expression rapidly increases after the beginning of the operation and reaches after a few seconds a practically stable condition, which represents the isochronous distortion degree at the time at which its observation takes place. Practically, the duration of the measurement operation is determined by associating with the distortiometer proper known means for disabling it after the elapsing of a predetermined time interval. The value of this interval may be selected at will, for instance 20 seconds, 5 seconds, etc., according to the particular studied modulation type.

To effect a new measurement, the operator actuates the switch (or other electrical element) which initiates the operation; this switch is so arranged as to bring at the same time counter C4 to the zero position.

Measurements may also be effected on a plurality of different modulations received, for instance, from different communication channels, but nevertheless all having the same modulation velocity (the case of different velocities is dealt with later on). In such a case, means for rapidly switching from one channel to another are provided. After the end of the measurements on a given channel, the operator switches another channel to the distortiometer and thereafter initiates a new operation on the modulation of the latter channel, and so on.

In such a case, it is necessary to provide means for recording the values of the various differences counted by C4 or, alternatively, direct recording of the respective distortion degrees of the various successively studied modulations. A known method for this purpose advantageously and economically makes use, for instance, of a perforated tape system. Reading of the measured values may be effected directly or after graphic transcription, at the end of a series of measurements.

In any embodiment of a device according to the invention, for instance in that described in detail hereinabove, some of the physical parameters of the intervening elements are connected with each other.

In the above-described embodiment, to obtain an accuracy of one-half percent, the recurrence frequency F1 is taken equal to the product by a factor $k$ of 200 of the modulation velocity. With such a value of said frequency, a distortion degree of fifty percent corresponds to the counting of the half of 200 pulses, that is 100. The next higher power of two 100 is number 128, that is the seventh power of two. Consequently, the rapid pulse trains must contain 128 pulses and counters C1, C2, C3 must have 7 stages to make it possible to transfer any number of counted pulses into one or the other of the maximum and minimum memories.

For an apparatus adapted to be used at modulation velocities of 50 bauds, for instance, and for an accuracy of 0.5%, a frequency of F1 of 10,000 cycles per second will be selected. For the same accuracy and for higher modulation velocities, such as those encountered in data transmission, for instance 600, 1200 or 2400 bauds (bits per second), frequencies F1 respectively equal to 120, 240, 480 kilocycles per second could be selected.

Generally speaking, a value $kV$ of frequency F1 allows to obtain a $100/k$ accuracy value in the measurement of distortion degrees, expressed in percent. The value of $k$ must be so selected as to allow to obtain the required accuracy. To obtain a measuring range equal to $P\%$ (P being an integer number lesser than 100), the common counting capacity to counters C1, C2, C3 must be given a value slightly higher than $kP/100$. The number of pulses contained in each rapid pulse train is normally equal to the latter capacity; the recurrence frequency of the rapid pulses must be given a high enough value to make the duration of one such train small in comparison with the average unit time interval of the studied modulation.

A device according to the invention may be so built as to allow measuring of distortion degrees for various modulation velocities by providing therein several groups of generators G1, G2, G3, the frequency characteristics of each of which is adapted to a particular modulation velocity. The various groups may be selected by switching, according to the modulation velocity of the particular signals, the distortion degree of which is to be measured. An apparatus capable of being used for the measurement of distortion at such various modulation velocities as 50, 75, 100, 200, 600, 1200 or 2400 bauds may thus be built.

What is claimed is:

1. Apparatus for measuring the isochronous distortion of a bivalent telegraph modulation having a given modulation velocity V and the spacings between the significant instants of which fluctuate about integer multiples of an average unit time interval equal to the reciprocal of said modulation velocity, comprising, in combination:

a terminal for receiving said modulation and switch means adapted to connect or disconnect said terminal to or from the remainder of said apparatus for a given measurement time interval;

a time base synchronized by said received modulation and delivering periodically recurring reference pulses with a period equal to said unit time interval and a phase such that each significant instant of said modulation is delayed with respect to a corresponding one of said reference pulses;

means for deriving from each transition of said modulation occurring at a significant instant thereof a corresponding significant pulse;

a first pulse generator delivering periodic measurement pulses at a frequency equal to a high order integer multiple $kV$ of said modulation velocity;

a first pulse counter and a second and a third pulse counter identical in their construction with said first counter; said counters each having a counting input, a zero resetting input and an output delivering an output pulse on returning to zero after reaching maximum counting capacity;

first electronic switching means controlled by said reference and significant pulses for applying said measurement pulses from said first generator to the counting input of said first counter during the time interval elapsing between each one of said significant pulses and the reference pulse immediately preceding latter said significant pulse;

a second pulse generator delivering rapid periodic pulses at such a frequency that the duration of a train of said rapid pulses in number equal to said maximum capacity be shorter than said unit time interval;

automatic switching means controlled by said significant pulses and causing, under the action of each one of said significant pulses, a train of said rapid pulses in number equal to said maximum capacity to be delivered by said second generator to the counting inputs of said second and third counters and through gate means and further switching means, respectively, to the counting input of said first counter and to the counting input of a fourth pulse counter having a counting and a zero-resetting input;

said further switching means including second, third and fourth electronic switching means controlled by said significant pulses and by the output pulses from said first, second and third counters for causing, during the delivery of said train of rapid pulses, the counting previously registered in said first counter to be transferred to either of said second and third counters according to the higher or lower value of said registered counting relatively to the countings previously and respectively registered in said second and third counters, or no such transferring if said registered counting in said first counter is neither higher than that already registered in said second counter nor lower than that already registered in said third counter; said further switching means causing at the same time the difference between the countings respectively registered in said second and third counters to be transferred to said fourth counter; and means for displaying the counting registered in said fourth counter at the end of said given measurement time interval.

2. Apparatus as claimed in claim 1, in which said gate means consist of an "OR" circuit having a first input receiving reference pulses from said first generator through said first electronic switching means and a second input receiving said significant pulses, the output of said "OR" circuit being connected to the counting input of said first counter.

3. Apparatus as claimed in claim 1, in which each of said electronic switching means has a signal input, a signal output and a first and a second control input, and in which the application of a control pulse to said first control input establishes a connection between said signal input and signal output, while the application of a control pulse to said second control input breaks off said connection.

4. Apparatus as claimed in claim 3, in which each one of said electronic switching means consists of a bistable circuit having a first and a second input and an output, combined with an "AND" circuit having two inputs and an output, and in which said first and second inputs of said bistable circuit constitute the two control inputs of said electronic switching means, while one output of said bistable circuit is connected to one of the inputs of said "AND" circuit, said electronic switching means having a signal input constituted by the other input of said "AND" circuit and a signal output constituted by the output of said "AND" circuit..

5. Apparatus as claimed in claim 3, in which one and the other of said control inputs of said first electronic switching means respectively receive said reference and significant pulses.

6. Apparatus as claimed in claim 1, in which said first second and third pulse counters are binary counters.

7. Apparatus as claimed in claim 1, in which, at the beginning of a measuring operation, said second counter is set at its zero position and said third counter is set at its maximum counting capacity position.

8. Apparatus as claimed in claim 1, in which said switch means consist of an automatic switch closing a contact by manual operation and automatically breaking said contact after a predetermined time interval.

9. Apparatus as claimed in claim 1, in which said time base includes means for adjusting the phase of said reference pulses in such a manner that every significant instant of said modulation be delayed with respect to the next preceding of said reference pulses by a small fraction of half said unit time interval.

References Cited

UNITED STATES PATENTS

| 3,176,070 | 3/1965 | Rumble | 178—69 |
| 3,182,127 | 5/1965 | Wiese | 178—69 |
| 3,420,950 | 1/1969 | Britt | 178—69 |

WILLIAM F. LINDQUIST, Primary Examiner

P. F. WILLE, Assistant Examiner

U.S. Cl. X.R.

178—69; 340—146.1